Nov. 22, 1966   J. A. GREENWOOD   3,287,035
PIPE HANGER
Original Filed Dec. 13, 1961                                       3 Sheets-Sheet 1
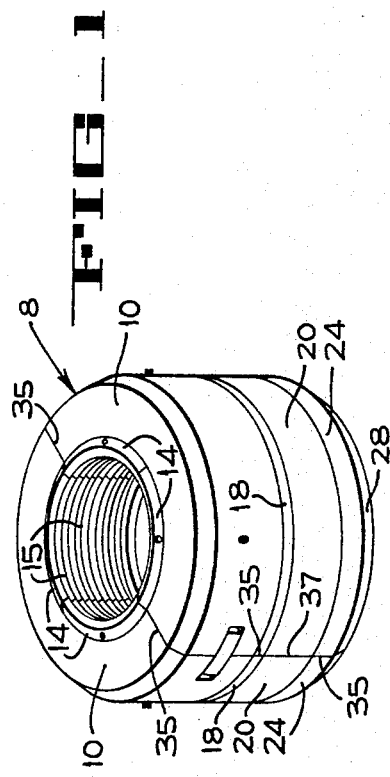
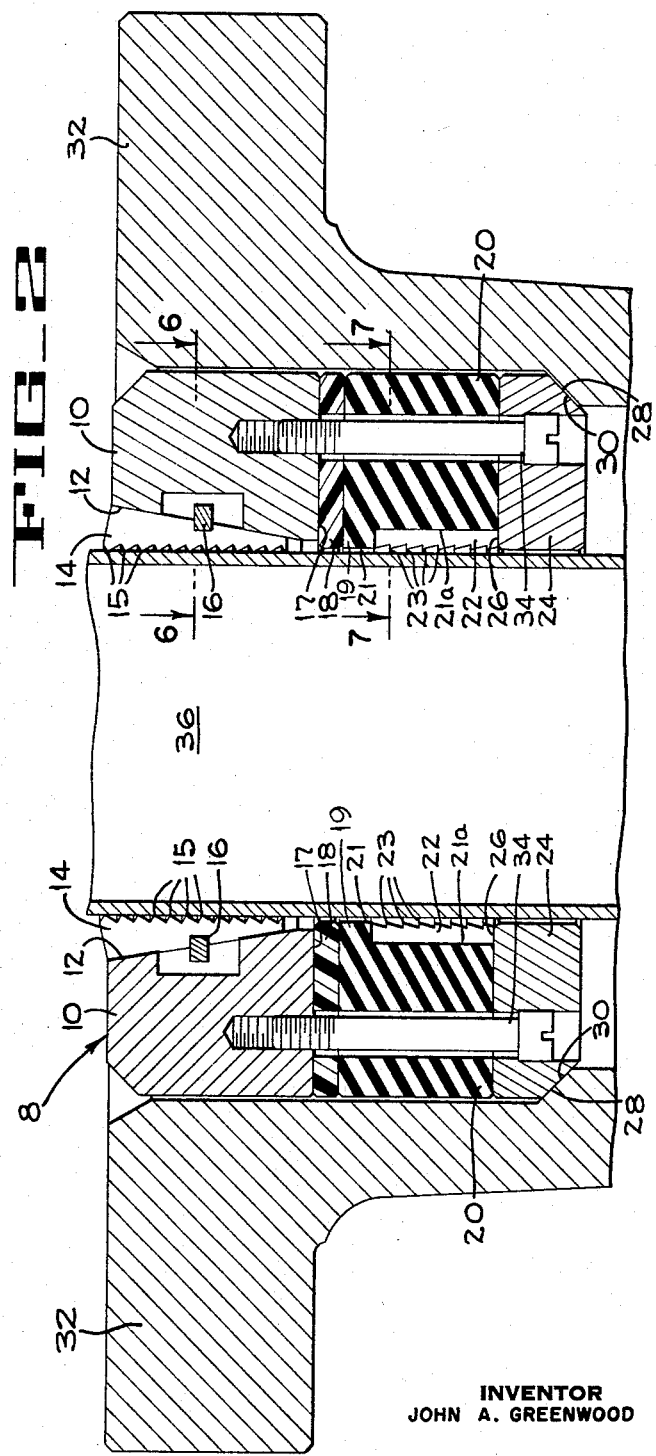
INVENTOR
JOHN A. GREENWOOD
BY *Hans G. Hoffmeister*
ATTORNEY

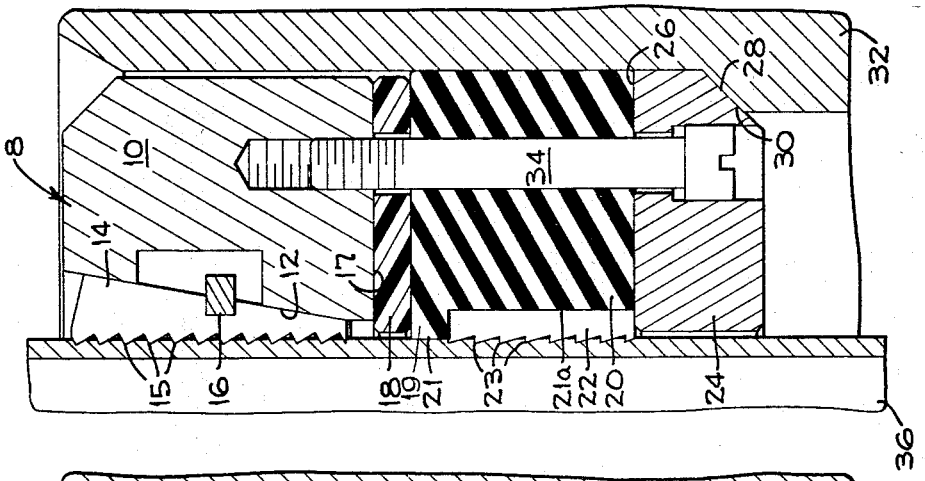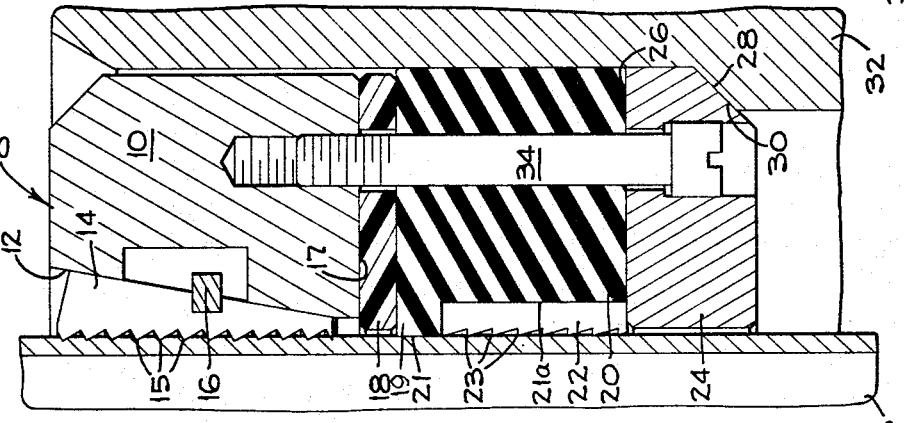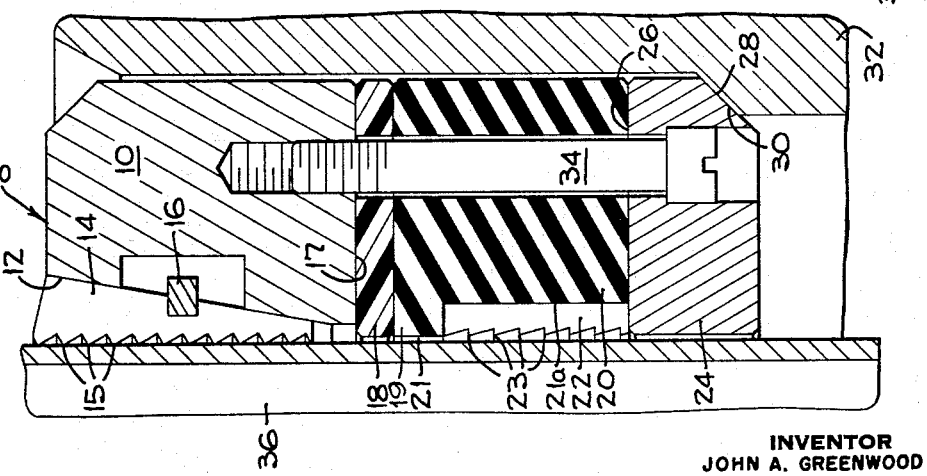

Nov. 22, 1966  J. A. GREENWOOD  3,287,035
PIPE HANGER
Original Filed Dec. 13, 1961  3 Sheets-Sheet 3
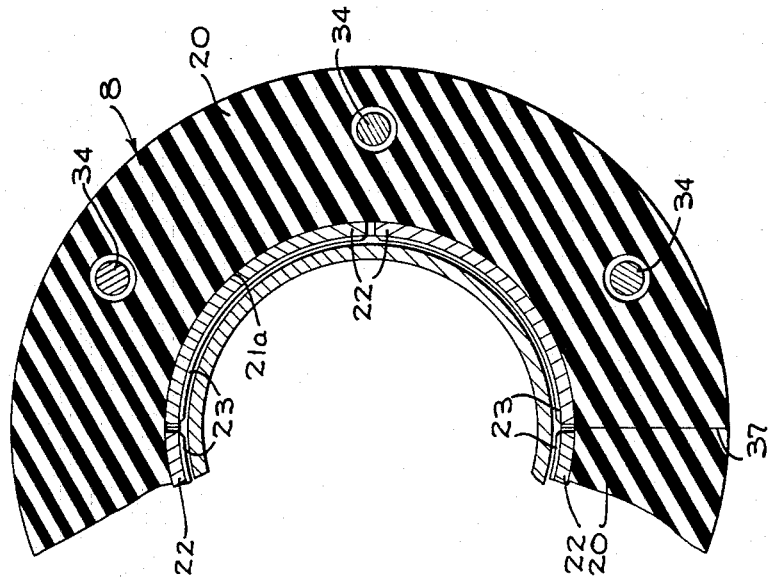
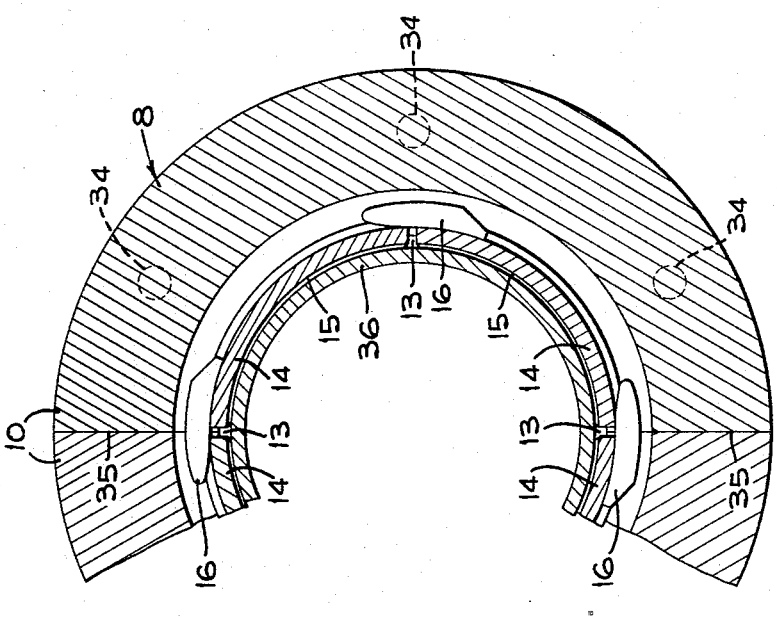
INVENTOR
JOHN A. GREENWOOD
BY *Hans G. Hoffmeister*
ATTORNEY United States Patent Office 3,287,035
Patented Nov. 22, 1966

3,287,035
PIPE HANGER
John A. Greenwood, Houston, Tex., assignor, by mesne assignments, to FMC Corporation, San Jose, Calif., a corporation of Delaware
Continuation of application Ser. No. 159,035, Dec. 13, 1961. This application Nov. 1, 1965, Ser. No. 511,577
8 Claims. (Cl. 285—147)

This application is a continuation of applicant's copending U.S. patent application, Serial No. 159,035, filed December 13, 1961, now abandoned.

The present invention pertains to a pipe hanger for a well apparatus and more particularly to a hanger for supporting well pipe while minimizing radial deflection of the pipe as a result of the supportive engagement of the hanger with the pipe.

In the use of casing hangers of the slip type, the slips apply to the casing a force tending to collapse the casing, which force creates an inward deflection of the casing wall. This inward deflection is undesirable since many tools which must be run thruogh the casing have diameter of the casing and when such a tool being run into the casing reaches a part of the casing where its wall has been inwardly deflected, the tool becomes stuck. The hanger of the present invention minimize this deflection of the casing, particularly in relatively concentrated areas of the pipe, and distributes the deflection that does occur over a greater area of the pipe. Although reference is subsequently made to "casing," it is to be understood that the subject hanger is also useful on tubing, or other well pipe.

An object of the present invention is to provide an improved casing hanger.

Another object is to provide a hanger in which a casing gripping jaw is forced into casing gripping engagement by radial expansion of a resiliently deformable body which expansion is caused by axial compression of the body.

Another object is to provide a hanger wherein axial compression of a resiliently deformable seal simultaneously forces the seal into fluid-tight contact with a casing and a casing hanging jaw into gripping engagement with the casing.

Another object is to provide a casing hanger including slips which are wedged into supporting relation with a casing, by the weight of the casing, and which axially compress a seal and cause the seal to radially force a gripping jaw into supporting engagement with the casing.

Another object of the present invention is to provide a casing hanger having increased carrying capacity.

Another object of the invention is to provide a casing hanger whose tendency to collapse the casing supported thereby is minimized.

Another object of the invention is to provide a casing hanger which minimizes the maximum inward casing wall deflection caused thereby by distributing the pressure of its gripping elements over a wide area of the casing.

Another object is to provide a casing hanger which avoids the tendency to loosen its grip upon a casing in response to fluid pressure exerted upward against it.

These and other objects and advantages of the present invention will be apparent from the following description taken in conjunction with the accompanying drawings, wherein:

FIGURE 1 is a prespective of the casing hanger of the present invention.

FIGURE 2 is a diametric section showing the casing hanger of FIG. 1 installed within a casing head and a casing in position to be engaged by the hanger.

FIGURES 3, 4 and 5 are fragmentary diametric sections illustrating the manner in which the hanger is set.

FIGURE 6 is a transverse section along line 6—6 of FIG. 2.

FIGURE 7 is a transverse section along line 7—7 of FIG. 2.

The casing hanger 8 of the present invention comprises a slip bowl 10 having a downwardly and inwardly tapered frusto-conical slip-receiving surface 12 within which are slidably supported a plurality of pipe-engaging slips 14.

As shown in FIG. 6, the slips 14 are four in number and each is arcuate in form, extending through slightly less than 90° of arc, so that the four slips 14 together constitute an annular assembly unit with only a relatively narrow space 13 between adjacent slips 14. In vertical sectian, each slip is wedge-shaped, the inner surface being vertical and the outer surface being inclined downward and inward to conform to the frusto-conical surface 12 of the slip bowl 10. Upwardly inclined teeth 15 are provided on the inner arcuate surface of each slip 14, extending horizontally from one end of the slip to the other. Each two adjacent slips 14 are interconnected by a key 16 seated within notches in the outer surfaces of the associated slips. Thus all four slips 14 are kept in horizontal alignment.

The slip bowl 10 terminates at its lower end in a flat surface 17. A flat thrust ring 18 of a suitable hard plastic such as "Micarta" is provided beneath the surface 17. A seal ring 20 of resiliently deformable sealing material such as rubber, "Neoprene" or the like is mounted beneath the thrust ring 18. An upper annular flange 19 of the seal ring 20 has an upper inner cylindrical wall 21 surrounding a bore only slightly greater than the outside diameter of the casing that the hanger 8 is designed to support. However, the ring 20 also has a lower inner cylindrical wall 21a surrounding a counterbore extending upward from the bottom surface of the ring 20 to the flange and throughout the major portion of the axial extent of the ring 20.

A plurality of jaws 22 are bonded to the inner wall 21a of the seal ring 20 and abut the flange 19. The jaws 22 resemble the slips 14 in that the latter also are four in number, and each is of arcuate form and of slightly less than 90° in angular extent. However, the jaws 22 differ from the slips 14 in that instead of being wedge-shaped in vertical cross-sectional form, the jaws are rectangular in vertical cross section. Thus, the four jaws 22 together constitute an annular assembly whose inner and outer surfaces constitute coaxial cylinders. The jaws 22 are provided on their inner surfaces with upwardly directed teeth 23 resembling the teeth 15 of the slips 14.

A junk ring or base member 24 is mounted beneath the resilient ring 20 and the slips 22. The junk ring 24 is provided with a flat upper surface 26 upon which the ring 20 and the jaws 22 rest. The lower outer edge of the junk ring 24 is beveled as at 28 and is adapted to rest on a beveled shoulder 30 in a casing head 32. The jaws have lower edges 22a slidably engaging the junk ring for radial movement thereon. A plurality of cap screws 34 slidably extend through aligned holes in the junk ring 24, the seal ring 20 and the thrust ring 18, and are screwed into taped holes in the bottom of the slip bowl 10 to retain the several elements in assembled relation. The slip bowl 10, the thrust ring 18 and the junk ring 24 are split diametrically, as shown at 35 in FIGS. 1 and 6, whereas the resilient seal ring 20 is split radially, as shown at 37 in FIGS. 1 and 7, to permit the casing hanger to be opened to slip around a casing 36.

In installing the casing hanger 8, it is slipped around a casing suspended within the well from the elevator of the well derrick (not shown) and is lowered, or permitted to drop, through the blowout preventors (not shown) until the beveled surface 28 seats on the support surface 30 within the casing head 32. The slips 14 slide down the frusto-conical surface 12 of the bowl 10 by gravity until they contact the outer surface of the casing. This is the condition illustrated in FIG. 3.

The casing 36 is then lowered. Initial downward movement of the casing 36 causes the slips 14 to slide farther down the surface 12, thus wedging the slips inward so that the teeth 15 on their inner surfaces bite into the outer surface of the casing 36, as illustrated in FIG. 4. Thus the engagement of the slips with the casing is made more positive, with the result that further downward movement of the casing 36 causes downward movement of the slip bowl 10. This increases the pressure which the thrust ring 18 exerts axially against the sealing ring 20, making it spread laterally or radially since it is confined above and below the thrust ring and the junk ring 24. The lateral spreading of the sealing ring 20 effects sealing contact of the outer periphery or wall thereof with the inner wall of the casing head 32, and sealing contact of the flange 19 with the casing 36. The lateral force in the material of the sealing ring 20 also forces the jaws 22 to bite into the casing 21 as illustrated in FIG. 5.

It should be noted that the upper surface 26 of the junk ring 24, upon which the jaws 22 rest, is substantially radially related to the casing 36 so there is no wedging action of the jaws 22. The only force applied to the jaws 22 which tends to collapse the casing 36 is the lateral force which exists in the material of the seal ring 20 as a result of downward movement of the slip bowl 10. It should be further noted that the weight of the casing 36 supported by the jaws 22 is tansferred to the junk ring 24 by direct metal-to-metal contact between the jaws 22 and the horizontal upper surface of the junk ring 24. There is no lateral component or collapsing force applied by that portion of the weight of the casing which is supported by the jaws 22.

If at any time the engagement of the jaws 22 with the casing is not sufficiently secure to prevent the casing 36 from moving downward, the resultant downward movement of the casing will cause the slips 14 to be lowered slightly, thus increasing the inward pressure of the slips against the casing, due to the wedging action which they develop in cooperation with the tapered slip bowl 10, and also increasing the downward pressure exerted by the thrust ring 18 against the seal ring 20. This, in turn, increases the inward pressure exerted by the deformable seal ring against the jaws 22, and correspondingly increases the pressure of the jaws against the casing. Eventually, therefore, a condition of equilibrium is established wherein the slips 14 support a substantial portion of the weight of the casing, and, in doing so cause sufficient downward pressure to be exerted against the deformable ring to cause the jaws 22 to engage the casing only with sufficient pressure to support the portion of the casing's weight which is not supported by the slips 14.

Thus it may be seen that the total weight of the casing 36 is distributed between the two sets of casing gripping members 14 and 22, thereby effectually diminishing the inward pressure exerted against the casing in any one region, and correspondingly diminishing the extent to which the casing wall is deflected. Whereas it has been found that when a standard casing hanger is used to support 5½ inch casing approximately 16,730 ft. long and weighing approximately 260,000 lbs. the deflection caused by the pressure of the hanger's slips reduces the internal diameter as much as .015 inch or more, the casing hanger of the present invention causes a maximum deflection (that is reduction in diameter) of only about .005 inch under the same loading.

In order to release their grip upon the casing, the jaws 22 move radially outward, and not obliquely upward and outward as do the slips 14. Since their releasing movement does not include any vertical component, the jaws 22 do not respond to fluid pressure imposed against them from underneath, with the result that even though the fluid pressure within the well may become very great, the jaws are not influenced thereby to release their hold upon the casing, so long as enough of the weight of the casing continues to be transmitted by the slips 14 to the seal ring 20 to prevent the jaws 22 from releasing their hold upon the pipe. Thus it may be seen that the absence of wedging action in the operation of the jaws 22 is significant factor in making the casing hanger of the present invention capable of maintaining its engagement with the casing in spite of increase in fluid pressure within the well.

While a preferred embodiment of the present invention is described herein, it should be noted that various changes may be made therein without departing from the spirit of the invention as defined in the appended claims.

The invention having thus been described that which is believed to be new, and for which protection by Letters Patent is desired is:

1. In a pipe hanger for use in supporting a pipe in a head member, a junk ring having an upper surface radially extended with respect to the ring's axis and a lower surface adapted to support the hanger in the head member, an annular seal of resiliently deformable material sized to substantially fill the space between the pipe and the head member and having an upper and a lower surface of substantial area, said seal's lower surface supported on the upper surface of said junk ring, said seal having an inner annular wall, a plurality of rigid pipe gripping members, each member of substantial arcuate extent and having one surface supported by and slidably engaging said upper surface of said ring and a second surface upstanding in contacting relation to said inner wall, a slip bowl supported by said seal's upper surface and having a downwardly and inwardly sloping inner surface, and a plurality of slips slidably engaging said inner surface of said slip bowl.

2. The pipe hanger of claim 1 including screws slidably extended through said junk ring and seal and threaded into said bowl.

3. The pipe hanger of claim 1 wherein said rigid pipe gripping members are bonded to said inner wall of the seal.

4. The pipe hanger of claim 1 including a thrust ring positioned between said bowl and said seal.

5. In a well apparatus including a head circumscribing a pipe projecting into the well; a rigid annular base member located within said head and circumscribing said pipe, said head including means supporting said base member and limiting movement thereof in a predetermined direction lengthwise of the pipe; an annular resiliently compressible and expandable body supported on said base member, said body encircling said pipe and having an inner wall directed toward said pipe, an outer wall facing said head, and an upper surface joining said walls, said body extending radially substantially the entire distance between said pipe and said head; at least two pipe gripping members each of substantial arcuate extent and positioned between said pipe and said inner wall of the body and slidably engaging said base member; a force transmitting element supported by said upper surface; and means for imposing a force on said element to urge the same in said predetermined direction for compressing said body lengthwise of said pipe and causing said body to apply force laterally inward against said pipe gripping members to slide said pipe gripping members along said base member whereby the body forces the pipe gripping members into gripping engagement with the pipe to support the pipe on the base member and causing said outer wall to be forced toward said head.

6. The apparatus of claim 5 wherein said body has an upper flange which projects radially inward of said inner wall over said pipe gripping members and is radially expanded into fluid-tight engagement with the pipe by said force imposing means.

7. The apparatus of claim 5 wherein said pipe gripping members are bonded to said inner wall of the body.

8. In a well apparatus including a head circumscribing a tubular member positioned in said head; a rigid annular supporting element located within said head and circumscribing said tubular member, means in said head for supporting said annular supporting element and limiting movement thereof in a predetermined direction lengthwise of the tubular member; an annular resiliently compressible and expandable body supported on said annular supporting element, said body encircling said tubular member and having a first wall directed toward said tubular member, a second wall facing said head, and an upper surface; a force transmitting element supported by said upper surface; at least two tubular member-engaging segments positioned between said tubular member and said first wall of said body and slidably engaging one of said elements; the combined radial thickness of said body and said segments, where said segments are engaged by said first wall, being substantially equal to the radial distance between said head and said tubular member and means for imposing a force on said transmitting element to urge the same in said predetermined direction for compressing said body lengthwise of said tubular member and causing said body to apply force laterally inward against said segments to slide said segments along the element with which they are slidably engaged whereby the body forces said segments into engagement with said tubular member to resist movement of said tubular member axially of said head.

References Cited by the Examiner
UNITED STATES PATENTS

| | | | |
|---|---|---|---|
| 2,047,569 | 7/1936 | Loomis | 285—146 X |
| 2,493,556 | 1/1950 | Stone | 285—146 |
| 2,532,662 | 12/1950 | Eckel et al. | 285—147 |
| 2,683,045 | 7/1954 | Brooks | 285—146 |
| 3,011,806 | 12/1961 | Allen et al. | 285—147 |

CARL W. TOMLIN, *Primary Examiner.*

D. W. AROLA, *Assistant Examiner.*

UNITED STATES PATENT OFFICE
CERTIFICATE OF CORRECTION

Patent No. 3,287,035　　　　　　　　　　　　　　November 22, 1966

John A. Greenwood

It is hereby certified that error appears in the above numbered patent requiring correction and that the said Letters Patent should read as corrected below.

Column 1, line 22, for "thruogh" read -- through --; same line 22, after "have" insert -- diameters substantially equal to the internal --.

Signed and sealed this 7th day of November 1967.

(SEAL)
Attest:

Edward M. Fletcher, Jr.　　　　　　　　　　　　EDWARD J. BRENNER
Attesting Officer　　　　　　　　　　　　　　　Commissioner of Patents